United States Patent
Gouskov et al.

(12)

(10) Patent No.: US 6,253,580 B1
(45) Date of Patent: *Jul. 3, 2001

(54) METHOD OF MAKING A TUBULAR MEMBER FOR OPTICAL FIBER PRODUCTION USING PLASMA OUTSIDE VAPOR DEPOSITION

(75) Inventors: Mikhail Ivanovich Gouskov; Evguenic Borisovich Danilov, both of St. Petersburg (RU); Mohammad Afzal Aslami, Sturbridge; Dau Wu, Southborough, both of MA (US)

(73) Assignee: FiberCore, Inc., Charlton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,970

(22) Filed: Dec. 19, 1997

(51) Int. Cl.⁷ .................................................. C03B 37/013
(52) U.S. Cl. .................................. 65/391; 65/426; 65/421
(58) Field of Search ............................... 65/391, 426, 421

(56) References Cited

U.S. PATENT DOCUMENTS

| | | |
|---|---|---|
| Re. 28,029 | 6/1974 | Keck et al. . |
| 4,162,908 * | 7/1979 | Ray .......................................... 65/60 |
| 4,224,046 | 9/1980 | Izawa et al. . |
| 4,402,720 * | 9/1983 | Edahiro . |
| 4,412,853 | 11/1983 | Partus . |
| 4,923,497 | 5/1990 | Leber et al. . |
| 5,000,771 | 3/1991 | Fleming, Jr. et al. . |
| 5,026,413 | 6/1991 | Lebert et al. . |
| 5,076,824 * | 12/1991 | Miller . |
| 5,397,372 * | 3/1995 | Partus ..................................... 65/391 |
| 5,466,431 * | 11/1995 | Dortman ................................. 501/99 |
| 5,522,007 | 5/1996 | Drouart et al. . |
| 5,609,666 | 3/1997 | Heitmann . |
| 5,692,087 | 11/1997 | Partus et al. . |
| 5,769,921 * | 6/1998 | Yokokawa . |

OTHER PUBLICATIONS

Van Nostrands Scientific Encyclopedia, 1983, p. 2257 6th edition.*
Dictionary of Electronics, Amos ed., Butterworths pub, 1990 p. 219.*
The Illustrated Dictionary of Electronics, 6th ed. Gibilisco, 1994 p. 502.*
Reed, Induction–Coupled Plasma Torch, Journal of Applied Physics, May 1961, pp. 821–824, vol. 32, No. 5, Lincoln Laboratory, Massachusetts Institute of Technology, Lexington, Ma.

* cited by examiner

Primary Examiner—John Hoffmann
(74) Attorney, Agent, or Firm—Patton Boggs LLP

(57) ABSTRACT

An apparatus and method for producing a tubular member, which is suitable for use as a starter tube or an optical fiber preform, on a rotating cylindrical target mounted on a lathe. The tubular member is made by means of plasma outside vapor deposition. In this process, a source gas comprising $SiCl_4$ and, optionally, a fluorine-laden chemical, is introduced into an air plasma. Both the air and the source gas are dry gases and have low hydroxyl content. The air plasma is created by a high-frequency induction plasma torch which travels along the length of the target on a carriage. The torch is provided with a short U-shaped gutter on either side of its rim directly beneath the target and the growing tubular member. This gutter helps channel reaction products of the source gas and the plasma so as to enhance deposition on the growing tubular member. The torch is further provided with an induction coil having a plurality of windings, the uppermost winding being maintained a predetermined distance from the surface of the tubular member as the latter is built up.

5 Claims, 4 Drawing Sheets

METHOD OF MAKING A TUBULAR MEMBER FOR OPTICAL FIBER PRODUCTION USING PLASMA OUTSIDE VAPOR DEPOSITION

BACKGROUND OF THE INVENTION

The present invention relates to methods for making optical fiber preform starter tubes ("starter tubes"), and optical fiber preforms. More particularly, it concerns a process for making such tubes and preforms by depositing silica with low hydroxyl content through a plasma process.

The prior art teaches various approaches for fabricating silica glass starter tubes, and for making optical fiber preforms. Starter tubes can be formed by heating silica and extruding it through an aperture. Both starter tubes and optical fiber preforms can be made by depositing doped or undoped silica onto a target using one of several techniques such as modified chemical vapor deposition (MCVD), vapor axial deposition (VAD), outside vapor deposition (OVD). Each of these methods starts with providing a rotating target, typically shaped in the form of a tube or a solid rod, and formed from glass, ceramic or one of several other materials. In certain cases, the rod or tube becomes an integral part of the preform but, in other cases, the rod will be removed. A heat source, such as a gas burner or a plasma source is positioned beneath the rotating target. The heat source will provide the required energy for the glass-forming reactions to form glass particles. Depending upon the nature of the process, these deposited glass particles are ready for the next processing, drying and sintering steps such as VAD or OVD processes. If it is an MCVD process, these particles will be fused into vitreous quartz by the same heat source.

When the target is mounted horizontally, the heat source travels along the length of the target to ensure uniform deposition. If the target is a tube, the glass forming particles and materials may be deposited either on the inside surface of the tube, in which case the outer diameter remains constant, or on the outside of the tube, in which case the outer diameter grows.

When the target is mounted vertically, it rotates around its vertical axis, and grows in both radial and axial directions. This results in a substantially cylindrical product whose diameter and length increase as deposition continues.

U.S. Pat. No. 4,224,046 to Izawa et al. teaches a method for manufacturing an optical fiber preform. Two gaseous raw glass materials, oxygen, hydrogen and argon are jetted upwards in a burner towards a vertically mounted, rotating cylindrical start member. Soot-like glass particles are formed by flame hydrolysis and deposited on the lower end of the start member. The start member is gradually withdrawn upwards to maintain a constant spacing between the its growing end and the burner. Upon completion of the deposition, the resulting soot-like glass preform is then dried and sintered to form a transparent glass preform.

U.S. Pat. No. 4,412,853 to Partus discloses an MCVD process to form an optical fiber preform starter tube. The process starts with a horizontally mounted, rotating tubular target formed from glass and having a preselected composition and optical characteristics. A vapor stream is fed through the tubular target as a heat source positioned beneath the tubular target traverses along the latter's length. This causes reaction products of the vapor stream to be deposited on, and fuse to, the interior surface of the tubular target. The deposited material has the same index of refraction as the tubular target, but a different composition. This reference also suggests that one may achieve the same effect by an outside vapor-phase oxidation process or an outside vapor-phase axial deposition process, but does not explicitly teach how this can be done.

U.S. Pat. No. 4,923,497 to Leber et al. is directed to the continuous manufacture of a vertically drawn silica starter tube. This process uses silicon dioxide, in particle form, in a closed crucible. Next, the softened silicon dioxide is drawn into a tube, by means of a shaping tool, through an opening in the bottom of the crucible. In this process, the closed crucible, and also a space immediately below where the tube is formed, are provided with a high hydrogen-containing atmosphere. In addition, a predetermined electrical potential difference is maintained between the shaping tool and the crucible to create an electrical field therebetween to reduce impurities.

U.S. Pat. No. 5,026,413 to Leber et al. is also directed to the manufacture of a vertically drawn silica tube. High silica-containing quartz is softened in a furnace and drawn into a tube through an opening in the crucible's bottom. The pressure inside the tube, and the pressure inside a chamber into which the tube is formed, are monitored and equalized to minimize the diameter deviation of the tube.

U.S. Pat. No. 5,522,007 to Drouart et al. teaches the use of plasma deposition to build up an optical fiber preform having high hydroxyl ion concentration. In this reference, hydroxyl ions are deliberately entrained in a plasma generating gas by passing the gas through a water tank before it is introduced into one end of a plasma torch having an induction coil. The plasma torch projects molten silica particles mixed with hydroxyl ions onto a rotating substrate preform. This results in a preform having an average hydroxyl ion concentration lying in the range of 50–100 ppm deposited onto the target preform. According to Drouart et al., this technique results in optical fibers having an attenuation of 0.32 dB/km and 0.195 db/km at 1310 nm and 1550 nm, respectively.

U.S. Pat. No. 5,609,666 to Heitmann teaches the use of a tubular substrate formed from a porous oxide ceramic to form a quartz glass tube. A burner operated with a mixture of methane, silicon tetrachloride $SiCl_4$ and oxygen is moved back and forth along the tubular substrate to deposit glass soot thereon. Simultaneously, a drying gas mixture comprising chlorine or thionyl chloride, along with other gases, is passed through the interior of the tubular substrate along the latter's axis. The purge gas removes the hydroxyl ions from the deposited glass soot. The deposited, purged glass soot body is removed from the tubular substrate and then subjected to further drying and sintering to form a low -OH concentration tube or rod.

The above processes all have disadvantages. First, tubes formed in a continuous process by drawing have high impurity levels, inclusions and, most often, a high hydroxyl content. Such tubes do not provide the desired mechanical and optical characteristics for the manufacture of optical fibers. Second, processes which call for soot deposition, followed by subsequent drying and sintering are expensive, and take a longer time, as they require two distinct steps which often cannot be carried out simultaneously.

SUMMARY OF THE INVENTION

It is an object of the invention to provide an apparatus and method for producing starter tubes and optical fiber preforms having less than 1 ppm hydroxyl content so that they may be used to form single mode fibers having an attenuation of less than 0.40 dB/km at a wavelength of 1310 nm and 0.20 dB/km at 1550 nm.

It is another object of the invention to produce such starter tubes and preforms at a low cost by reducing the number of steps entailed in their manufacture.

It is yet another object of the invention to produce a starter tube for a preform which may subsequently be fabricated into optical fibers having good strength.

These and other objects are achieved by the present inventive method for forming a starter tube and an optical fiber preform. In the present process, a plasma source is placed in proximity to a target onto which the silica material is to be deposited. A dry plasma gas having a low hydroxyl concentration is used to form the plasma. A dry quartz source gas comprising at least $SiCl_4$, or other similar source gases and also having a low hydroxyl concentration, is introduced in proximity to the plasma. This causes the material to be converted to silica ($SiO_2$) and deposited onto the target and fused into vitreous quartz in one simple step. Doping the source gas with fluorine in one of a plurality of forms results in a starter tube with a lower index of refraction than pure silica for a preform which may subsequently be drawn into fibers having greater strength and good optical performance.

BRIEF DESCRIPTION OF THE DRAWINGS

These and other features, aspects, and advantages of the present invention can be seen in the drawings in which.

DESCRIPTION OF THE PREFERRED EMBODIMENT

Figure 1:
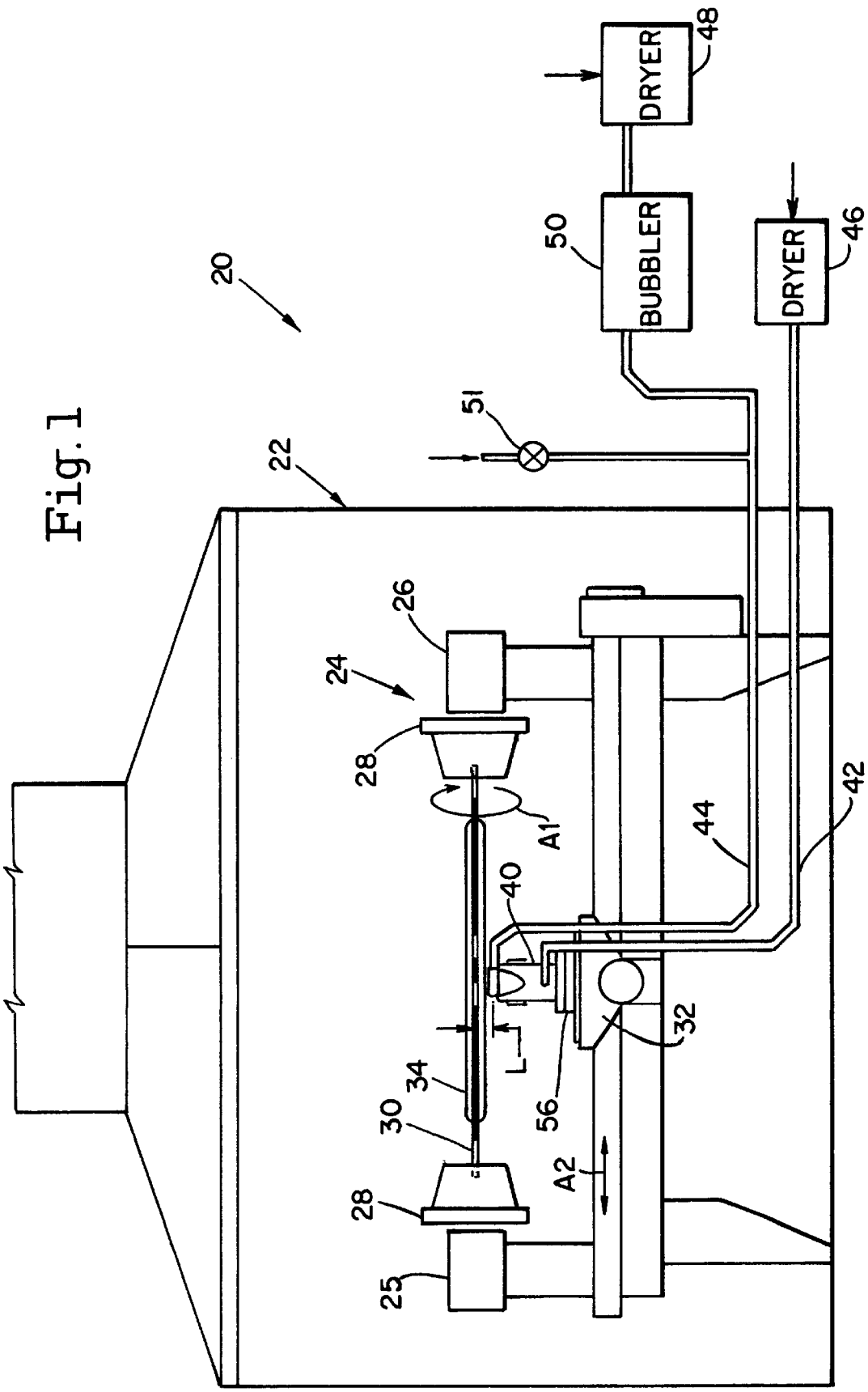
FIG. 1 shows an apparatus in accordance with the present invention.

FIG. 1 shows an apparatus 20 in accordance with the present invention. The apparatus comprises a chamber 22 which is sealed so as to prevent impurities from being introduced into the final product.

Within the chamber 22 is a lathe 24, such as that available from Litton Engineering Lab. The lathe 24 has a headstock 25 and a tailstock 26. The headstock 25 and the tailstock 26 are provided with a pair of opposing rotating spindle chucks 28 which hold the ends of an elongated target 30 having a substantially cylindrical outer wall. The spindle chucks 28 rotate target 30, as indicated by arrow A1. A movable carriage 32 movably mounted to the lathe 24 is arranged to travel in either direction along the target, as indicated by double headed arrow A2.

A plasma source, shown generally as 40, is supported by carriage 32. Carriage 32 thus moves plasma source 40 along the length of the target 30. This results in the deposition of material on top of the target 30 to form a tubular member 34, which maybe a starter tube, or an optical fiber preform. The spindle chucks 28 rotate the target 30 to ensure that material is uniformly deposited by the plasma source 40 around the target so as to form a tubular member 34 having nearly perfectly cylindrical outer walls.

In the preferred embodiment, the plasma source 40 positioned on the carriage 32 moves in both directions along a substantial portion of the length of the target 30. This allows the plasma source 40 to travel along this portion of the target 30 and deposit materials therealong.

Instead of moving the plasma source 40 along the length of the target, the target 30 may be moved while the plasma source 40 remains stationary. This can be realized by having the headstock 25 and the tailstock 26 of the lathe move the target in a reciprocating fashion so that all relevant portions of the target are brought directly above the plasma source 40.

As another alternative, a plurality of plasma sources may be spaced apart along the length of the target. This allows for reduced movement of either the headstock 25 and tailstock 26 of the lathe 24, or the carriage 32 to which the plasma sources are attached, depending on which of the two is configured to move. In the extreme case where a great number of plasma sources are provided all along the length of the target, no movement of either the carriage 32 or the headstock 25 and tailstock 26 of the lathe 24 is needed.

In the preferred embodiment, the plasma source 40 is an induction plasma torch having a dry plasma gas introduced into it through a first gas line 42 and a source gas introduced into it through a second gas line 44.

The plasma gas is substantially comprised of nitrogen and oxygen in an appropriate, predetermined proportion. Air may serve as the plasma gas. In such case, air first passes through a first dryer 46 to remove moisture before entering the first gas line 42. This ensures that the hydroxyl concentration of the plasma gas is low, on the order of 2.0 ppm, or less.

The source gas comprises a source chemical such as $SiCl_4$, and at least one carrier gas, such as oxygen $O_2$ or nitrogen $N_2$. The carrier gases enter the second dryer 48 to remove moisture. This ensures that the hydroxyl concentration of the source gas is also very low, on the order of 0.5 ppm. After the carrier gases are dried, they proceed to a bubbler 50 to pick up the source chemical. The gas stream comprising carrier gases laden with the source chemical then proceeds to the second gas line 44. Optionally, by opening valve 52, a dopant gas may be introduced into the gas stream before it reaches the induction plasma torch.

In the preferred embodiment, the source chemical is $SiCl_4$. This chemical is chosen for its reactive properties in a plasma. Specifically, the $SiCl_4$ serves as a source of Si to form $SiO_2$ which is deposited on the target 30. The dopant is typically a fluorine dopant gas in the form of $SiF_4$ or $SiF_6$. Fluorine dopants modify the index of refraction of the quartz and add a degree of freedom to the design of optical fiber preforms.

Figure 2:
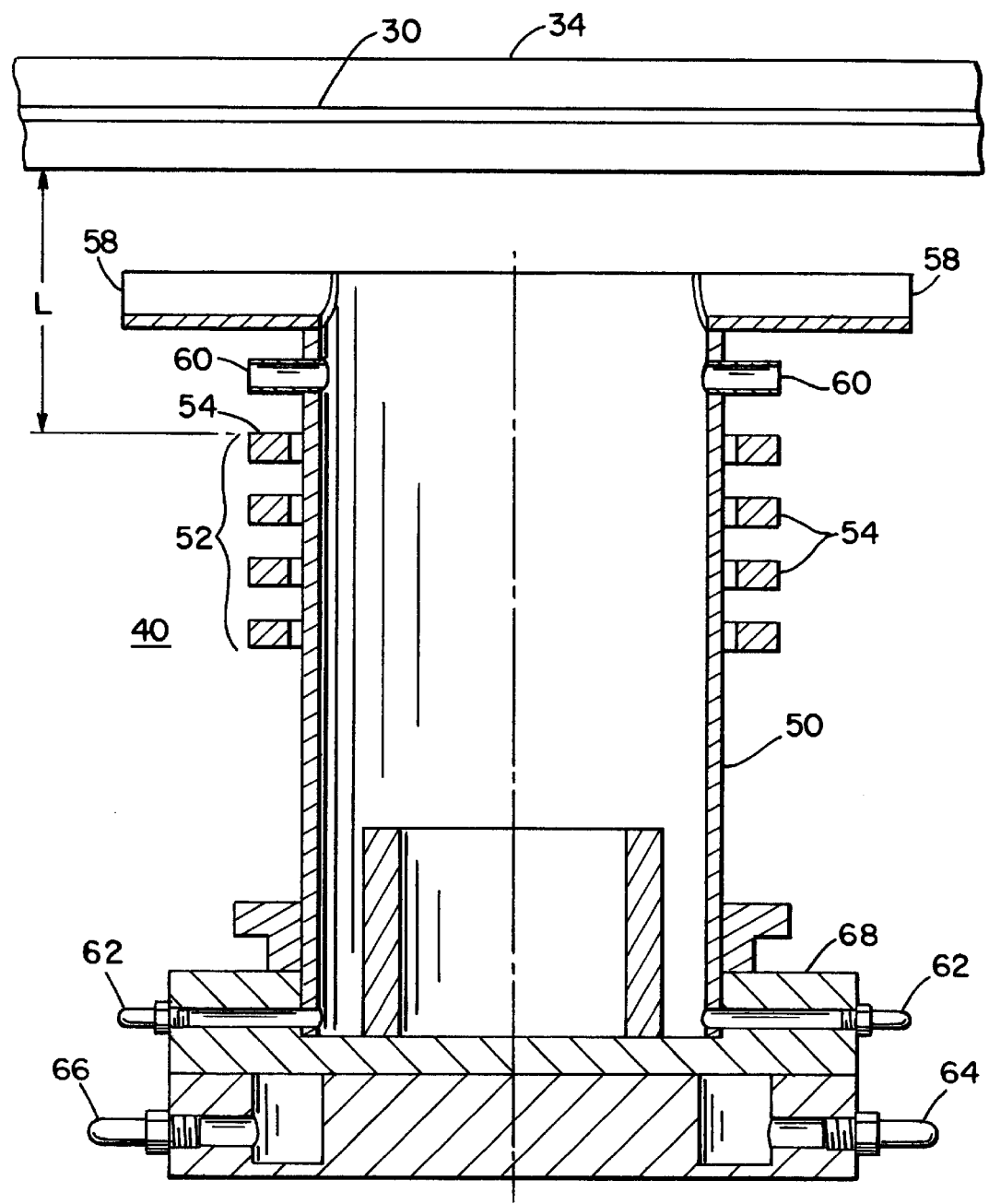
FIG. 2 shows a partial side view of a plasmatron used in the apparatus of the present invention.

FIG. 2 shows a cutaway side view of an induction plasma torch 40 positioned below the target 30. The induction torch 40 comprises a substantially tubular torch housing 50 formed from quartz. The housing has a diameter of 60 mm and a height of 220 mm. However, diameters ranging from 40–80 mm and heights between 180–400 mm may also be used.

A copper induction coil 52 is provided around the upper portion of the housing 50. The coil 52 comprises a plurality of windings 54 having a diameter of approximately 72 mm and spaced apart from each other by 6 mm. A gap between the housing and the coil can be between 2–10 mm. The uppermost portion of the coil 52, as indicated by uppermost winding 54', is separated from the outer surface of the tubular member 34 by a spacing designated by L, which is on the order of 30–55 mm.

As the quartz glass is deposited, its outer diameter increases. However, the spacing L is maintained by adjusting the height of a support stand 56 on which the induction plasma torch 40 is placed. Support stand 56, in turn, is mounted to carriage 32, and moves laterally therewith.

Initially, the support stand 56 is set at a predetermined height, and this height is reduced as the diameter of the deposited material increases during deposition. This maintains a predetermined distance between the plasma torch 40 and the deposited material. An optical or other sensor mounted on the carriage 32 and connected to a controller may be used to gauge the distance of the radially growing tubular member 34 from the carriage, and adjust the height of the support stand 56, accordingly.

On either side of the uppermost portion of the housing 50 is a plasma stabilizer bar 58. Each stabilizer bar is formed from quartz and comprises a U-shaped gutter extending laterally from the rim of the housing 50. The stabilizer bars 58 have a diameter of 60 mm and extend 20 mm on diametrically opposite sides of the housing rim, although diameters in the range of 40–80 mm and lengths of 15–40 mm may also be used. When the induction plasma torch 40 is in use, the stabilizer bars 58 are aligned parallely to the target. This arrangement helps spread the reactive source chemicals being deposited onto the growing tubular member 34.

Figure 3:
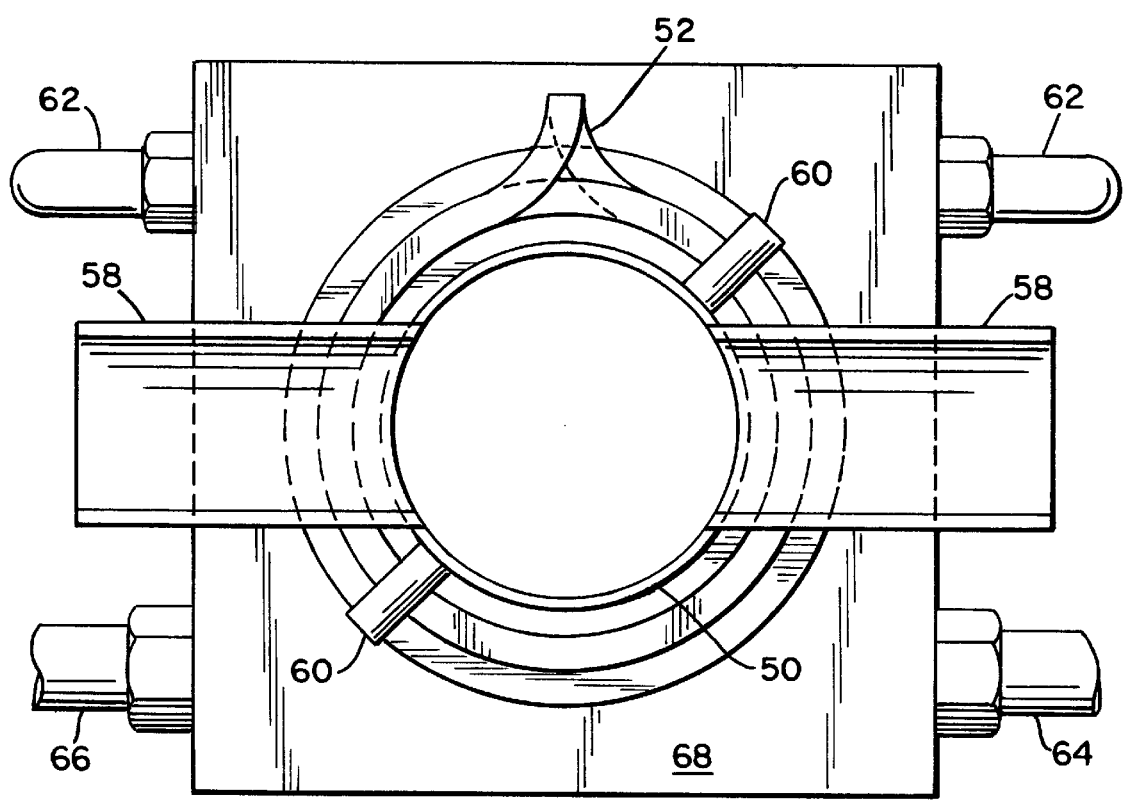
FIG. 3 shows a top view of a plasmatron similar to that shown in FIG. 2.

A pair of injection ports 60 connect the second gas line 44 carrying the source chemicals to the induction plasma torch 40. The injection ports 60 enter the housing at substantially the same height along the housing 50, at a point between the uppermost windings 54' of the coil 52 and the stabilizer bars 58. The injection ports comprise quartz tubing having a diameter of 5 mm, although tubing diameters on the order of 3–10 mm may be used with the induction plasma torch 40 of the present invention. In the preferred embodiment, a pair of injection ports 60 enter the housing 50 at the same height and are positioned diametrically across from each other. Instead of just two such ports, however, three or even more ports, symmetrically arranged, may be provided. In FIG. 2, the two injection ports 60 are shown to be directly beneath the stabilizer bars. This, however, is not an absolute necessity, and the injection ports 60 may be angularly offset from the stabilizer bars 58, in a top view of the induction plasma torch, as shown in FIG. 3.

A pair of plasma gas inlets 62 connect the first gas line 42 carrying the plasma gases to the induction plasma torch 40. The plasma gas inlets 62 enter the housing at substantially the same height, proximate to the base of the housing. These inlets 62 comprise stainless steel tubing having a diameter of 5 mm, although a range of diameters may suffice for this purpose.

The induction plasma torch 40 is also provided with a coolant inlet 64 and outlet 66. During use, a coolant, such as water, passes through the inlet 64, circulates within the outer wall of the housing 50, and exits through the outlet 66. The coolant inlet and outlet are formed from stainless steel and have a diameter of 5 mm. As with the plasma gas inlet and the injection port, this diameter may also vary.

The plasma gas inlets 62, the coolant inlet 64 and the coolant outlet 66 are all formed in a stainless steel chamber 68. The chamber 68 is a stainless steel square block 80 mm on a side, and having a height of approximately 40 mm. The chamber 68 is mounted onto the support stand 56 which, in turn, is mounted on the carriage 32 for movement along the target 30.

A high frequency generator (not shown) is electrically connected to the coil 52, powering the latter with a variable power output up to 60 kW at a frequency of 5.28+/−0.13 MHz. In the preferred embodiment, the generator is Model No. IG 60/5000, available from Fritz Huttinger Electronic GmbH of Germany. This generator is driven with a 50 Hz, 3-phase, 380 V power supply to energize the induction plasma torch 40.

Figure 4:
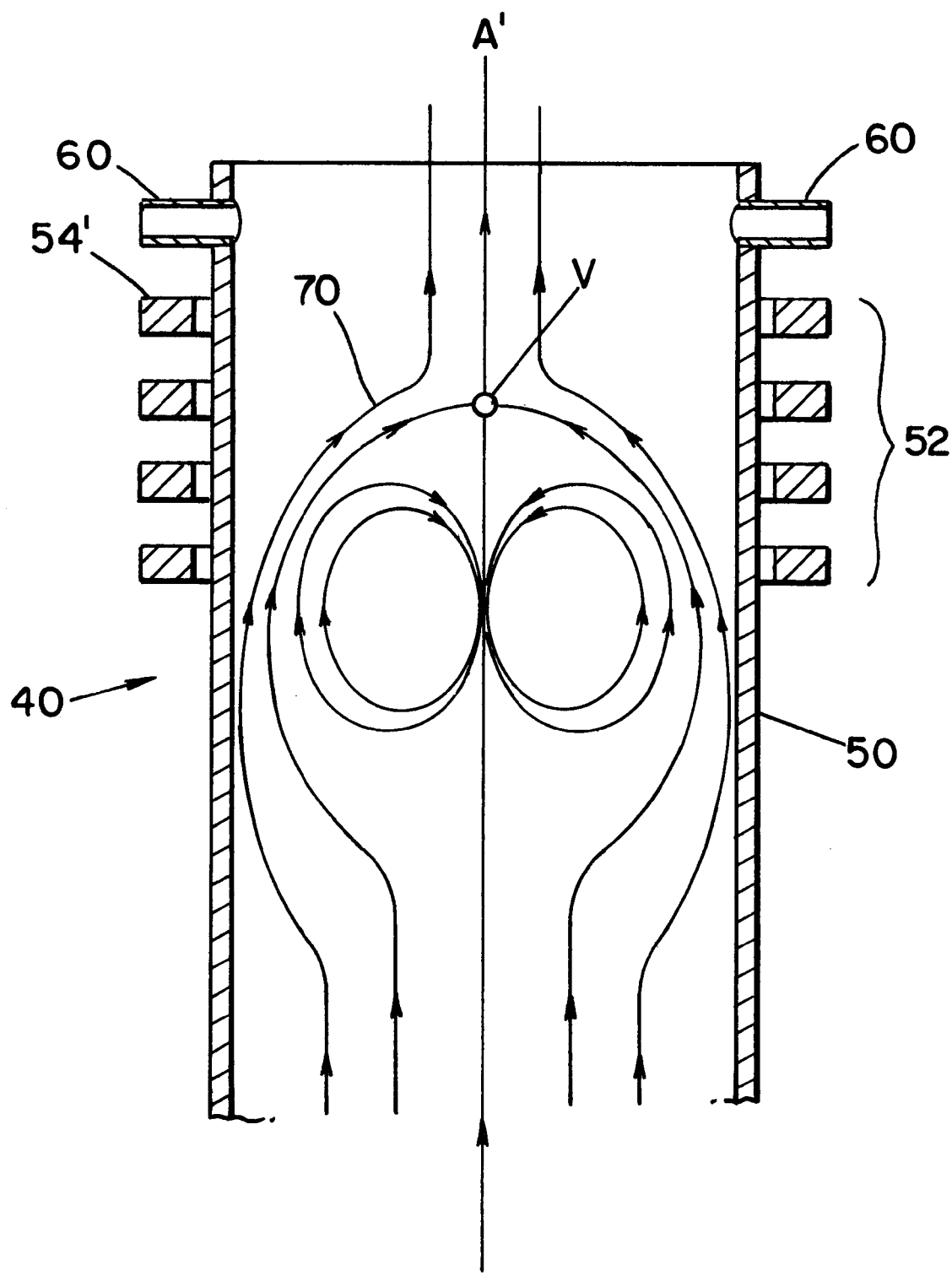
FIG. 4 shows a flow pattern of the plasma within the plasmatron used in the present invention.

FIG. 4 depicts the plasma jet 70 formed within the induction plasma torch 40 when the dry plasma gas is fed through the inlets 62 and converted into a plasma. The plasma jet 70 is substantially symmetric about the torch's longitudinal axis A'. The position of the injection ports 60 is such that the source chemicals are introduced into the plasma just above a point V where the vertical velocity of said plasma is zero. This provides the needed structure of hydrodynamic and thermal flow of the source chemical jet into the border layers to realize efficient deposition onto the growing tubular member 34. And while the preferred embodiment has the injection ports entering laterally into the housing, this is not an absolute requirement. Instead, the source gases may introduced into the center of the plasma jet 70 by a water cooled probe extending along the longitudinal axis A' of the induction plasma torch 40.

In the preferred embodiment, the deposition target is a silica glass (quartz) tube having an outer diameter of 24 mm and an inner diameter of 19 mm. Thus, the tube has an initial wall thickness of approximate 2.5 mm. As material is deposited on the outer surface of the tube, the tube's thickness grows. Tubular members with a diameter as large as 80 mm and less than 1 ppm hydroxyl content can be formed using the method and apparatus of the present invention. By using a jacketing tube having an outer diameter of 80 mm and an inner diameter of 19 mm, it is possible to produce more than 400 Km of 125 $\mu$m diameter single mode fibers.

Instead of a deposition target comprising a silica glass tube, other targets may be used. For instance, a graphite rod can be used as the deposition target. In such case, the deposited material forms a tube atop the graphite rod, and the resulting tube may later be detached from the graphite rod. Alternatively, a graphite rod having a sleeve formed from a thin walled tube may be used. The graphite rod in this case provides structural support for the thin walled tube. The thin walled tube may be formed from silica or the like. It may also be doped to impart to it a predetermined index of refraction. During deposition, the deposited material is fused to the thin walled tube. The deposited material may have an index of refraction different from that of the thin walled tube, but this is not essential. Also, instead of using a graphite rod to provide structural support for the thin walled tube, the thin walled tube may be pressurized. As before, the deposited material is fused to the thin wall tube, which typically is formed from doped or undoped silica. Moreover, using a doped rod, such as a primary preform, as a target, additional silica material can be deposited until a single or multi-mode fiber of a designed diameter is obtained. In such a situation, the jacketing step as was taught in Perry's U.S. Pat. No. 4,596,589 can be eliminated by direct depositing of additional cladding material.

The advantages of making a starter tube using the method and apparatus of the present invention are three-fold. First, the present invention results in a higher quality tube, as the impurities, inclusions, and hydroxyl content is reduced as compared to the continuous method of making a starter tube from natural quartz particles. Second, the present invention allows for the formation of a starter tube while providing very good control of the tube geometry. And third, the present invention is a simple, single-stage process which is cheaper to use than a multi-stage process, such as those involving the deposition of soot followed by conversion of the soot into a vitreous material suitable for the intended use.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

What is claimed is:

1. A method for forming a substantially pure silica glass starter tube on a graphite target, the starter tube having a purity and index of refraction suitable for use in optical fiber formation, said method comprising steps of:

providing a high frequency induction plasma torch comprising a coil, said induction plasma torch being selectively positionable along a length of said target, a spacing of 30–35 mm separating the target from said coil;

introducing a plasma gas consisting essentially of a gas from a group consisting of (air, and a mixture of oxygen and nitrogen) and having a hydroxyl content of less than 2 ppm into the induction plasma torch to form a plasma within said coil;

injecting a source gas having at least $SiCl_4$ and having a hydroxyl content of less than 0.5 ppm into said plasma;

depositing at least one reaction product of said plasma and said source gas onto the graphite target while maintaining said spacing between said target and the coil; and removing said graphite target to obtain said substantially pure silica glass tube.

2. The method of claim 1, wherein said coil comprises a plurality of windings, and the target is separated from a winding closest to the target by said spacing.

3. The method of claim 1, comprising the additional step of drying the plasma gas before it is introduced into the induction plasma torch.

4. A method according to claim 1, wherein the source gas is introduced into the plasma above all points at which there is plasma having a velocity which is zero in a direction parallel to a longitudinal axis of said coil.

5. A method according to claim 1, wherein said plasma torch further comprises a stabilizer bar arranged at a top portion of the coil, such that said stabilizer bar extends parallel to the target, and is arranged between the target and the top of the coil in manner to spread the source gas and plasma onto the target.

* * * * *